Patented June 14, 1927.

1,632,666

UNITED STATES PATENT OFFICE.

STUART B. MOLONY, OF WELLESLEY HILLS, MASSACHUSETTS, AND YASUJURO NIKAIDO, OF BAY CITY, MICHIGAN, ASSIGNORS, BY MESNE ASSIGNMENTS, TO CHARLES W. BROWN, WILLIAM L. CLAUSE, AND EDWARD PITCAIRN, OF PITTSBURGH, PENNSYLVANIA.

RUBBER VULCANIZATION AND PRODUCT THEREOF.

No Drawing. Original application filed April 12, 1920, Serial No. 373,368. Divided and this application filed September 25, 1926. Serial No. 137,811.

The invention relates to the vulcanization of rubber or caoutchouc. It has for its principal objects the provision of a process whereby the rapidity of vulcanization can be increased, whereby the time or temperature of vulcanization can be lessened, which can be practiced at a minimum of expense with a relatively small quantity of the accelerating agent, and the provision of a product which is of superior quality and durability.

In its broadest form, the invention contemplates vulcanizing rubber by treating the same with a vulcanizing agent and the reaction product formed by combining an organic compound containing a basic radical or chain with a metal constituent. More specifically, the invention contemplates the vulcanization of rubber by combining the rubber with a vulcanizing agent and an accelerator comprising a dithiocarbamate containing a metal constituent and an organic radical. The invention contemplates the use of possible modifications of the metal salts of dithiocarbamic acid set forth in the application of Y. Nikaido, Serial No. 466,999 now Patent No. 1,513,122, and the use of modifications of the compounds set forth in the application of Stuart B. Molony, Serial No. 346,307, which has matured into U. S. Patent No. 1,558,707.

Our invention also contemplates vulcanizing rubber by treating the same with a vulcanizing agent and a dithiocarbamic compound in which an inorganic constituent is present. Specifically, the hydrogen or other groups can be substituted either in the esters, the metallic salts or the acids.

Such modifications are accomplished by the substitution of elements, groups, or radicals, either in the place of the metals of the salts, or the hydrogen of the acids, or in place of the hydrogen or alkyl of the amido group, or both; for instance, in the first case the substitution for the hydrogen of the acid or for the metals of the metallic salts, of other elements or groups such as alkyl groups, aromatic groups including phenyl, naphthalene, anthracene, etc., thus forming corresponding salts, i. e., esters, of the dithiocarbamic acids, and in the second case, in the amido group, the substitution for the hydrogen or alkyl groups, of other elements or groups, such as phenyl, anthracene, pyridine, cyanogen, alkyl, the various chlorides, etc., which can be substituted for the hydrogen of the amido group, either in the acids or in the metallic salts or esters.

The esters of the alkylated dithiocarbamic acids can be prepared from the amino ammonium salts of the same acid by treatment with iodoalkyls, iodophenyls, etc., when the base forming amino ammonium group $NH_2(CH_3)_2$ or $NH_3(CH_3)$, is replaced by the alkyl, phenyl, etc., groups; or the base forming $NH_3(C_6H_5)$ group, etc., can be replaced in the same way, the esters can also be prepared from chlorodithiocarbonic esters and amines as:

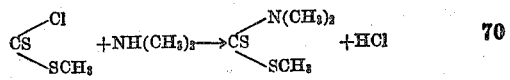

The replacement of the alkyl groups in the amido group by hydrogen, phenyl, naphthalene, pyridine, etc., can be accomplished by the regular methods for effecting substitutions in the amido group.

Aniline salt of phenyl dithiocarbamic acid may be prepared by mixing ten parts of carbon bisulphide, twenty parts of aniline and five parts of ethyl alcohol and leaving the mixture in a current of cool dessicated air until all the alcohol and excess of carbon bisulphide are evaporated, when the liquid becomes nearly odorless. This liquid is aniline salt of phenyl dithiocarbamic acid which was formed according to the following equation:

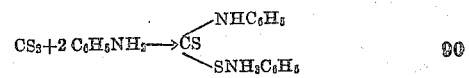

This compound is very unstable and when treated with 75% alcohol saturated with zinc sulphate, zinc salt of phenyl dithiocarbamic acid is precipitated. The aniline salt of phenyl dithiocarbamic acid is typical of a compound containing a basic nitrogen radical and the zinc sulphate may be termed "a metal containing constituent", these two reacting to form as a reaction product, the zinc salt of phenyl dithiocarbamic acid. The latter compound is substituted dithiocarbamic acid containing a metal constituent and an organic radical or chain. The salt is quite stable as repeated washings with water has no effect upon the composition of the compounds. It may be washed with water, filtered, and dried in a current of warm dry air. Other metallic salts of phenyl dithiocarbamic acid may be obtained in the like manner.

Methyl ester of phenyl dithiocarbamic acid may also be obtained by mixing phenyl mustard oil and methyl mercaptan according to the following equation:

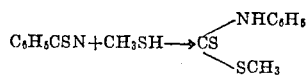

The advantages to be derived from some of these substitutions are the wide range they give in the melting point not possible in the acid or metallic salts, as they are all of comparatively high melting points; and also the greater ease of manufacture.

The methods of use of the various accelerating agents herein set forth, as to the quantity employed, the time of vulcanization, the heat required and the proportions of zinc oxide, sulphur and other ingredients vary wirdly. As a specific illustration, we have found that the methyl ester of dimethyl dithiocarbamic salt, whose production has been described herein, may be used in substantially the same way and in the same proportions as the mixture of monomethyl dithiocarbamate of zinc and dimethyl dithiocarbamate of zinc described in the Nikaido Patent No. 1,513,122, the formula being:

100 parts by weight of smoked ceylon, 50 parts by weight of zinc oxide, 5 parts by weight of sulphur, 1/5 parts by weight of accelerating agent.

With steam pressure of 50 pounds in a press, a good cure will be obtained in about ten minutes. At three pounds steam pressure a good cure will be obtained in a press in about forty-five minutes.

The present application is a division of Molony and Nikaido application, Serial No. 373,368 filed April 12, 1920. In the claims the expression

is intended to cover a dithiocarbamic compound in which the radical R includes an inorganic constituent such as a chloride, cyanogen, or their equivalents, and the radical R' includes a metal or an organic constituent.

We claim:

1. The process of vulcanizing rubber comprising combining the same with a vulcanizing agent and an accelerator comprising a dithiocarbamic compound containing a metal constituent and an aromatic constituent.

2. The process of vulcanizing rubber comprising combining the same with a vulcanizing agent and an accelerator agent comprising a dithiocarbamate containing a metal constituent and an aromatic constituent.

3. The process of vulcanizing rubber comprising combining the same with a vulcanizing agent and an accelerator comprising a dithiocarbamic compound containing an inorganic constituent substituting in the amido group thereof and a metal constituent.

4. The process of vulcanizing rubber comprising combining the same with a vulcanizing agent, and an accelerator comprising a dithiocarbamate containing and an inorganic constituent substituting in the amido group thereof and a metal constituent.

5. The process of vulcanizing rubber comprising combining the same with a vulcanizing agent and an accelerator comprising a dithiocarbamic compound having the radicals R and R' attached to the nitrogen and sulfur atoms respectively, the radical R including an inorganic constituent and the radical R' an organic constituent or a metal, said dithiocarbamic compound being typified by the formula

6. The process of vulcanizing rubber comprising combining the same with a vulcanizing agent and an accelerator comprising a dithiocarbamic compound having the radicals R and R' attached to the nitrogen and sulfur atoms respectively, the radical R containing an acid forming inorganic constituent and the radical R' an organic constituent or a metal, said dithiocarbamic compound being typified by the formula

7. The process of vulcanizing rubber comprising combining the same with a vulcanizing agent and an accelerator comprising a dithiocarbamic compound containing a chlorine constituent substituting in the amido group thereof.

In testimony whereof we hereunto affix our signatures.

STUART B. MOLONY.
YASUJURO NIKAIDO.